(12) United States Patent
Zhu et al.

(10) Patent No.: US 7,841,873 B2
(45) Date of Patent: Nov. 30, 2010

(54) FLASH MEMORY DEVICE WITH A RETRACTABLE PLUG

(75) Inventors: Zhi-Wen Zhu, Kunshan (CN); Jin-Kui Hu, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 202 days.

(21) Appl. No.: 12/291,599

(22) Filed: Nov. 12, 2008

(65) Prior Publication Data

US 2009/0124104 A1    May 14, 2009

(30) Foreign Application Priority Data

Nov. 12, 2007    (CN) .................... 2007 2 0042231 U (51) Int. Cl.
*H01R 13/44*    (2006.01)
(52) U.S. Cl. ...................................................... 439/131
(58) Field of Classification Search .................. 439/131
See application file for complete search history.

(56) References Cited

U.S. PATENT DOCUMENTS

| | | | |
|---|---|---|---|
| 5,928,009 A * | 7/1999 | Lee ............................. | 439/131 |
| 6,743,030 B2 | 6/2004 | Lin et al. | |
| 7,420,803 B2 * | 9/2008 | Hsueh et al. ........... | 361/679.41 |
| 7,530,823 B1 * | 5/2009 | Thornton et al. ............ | 439/136 |
| 7,558,070 B2 * | 7/2009 | Kang ........................ | 361/752 |
| 7,632,113 B2 * | 12/2009 | Finn ........................... | 439/131 |
| 7,708,570 B2 * | 5/2010 | Ni et al. ...................... | 439/131 |
| 2006/0131431 A1 * | 6/2006 | Finn ............................ | 235/492 |
| 2008/0160802 A1 * | 7/2008 | Ni et al. ...................... | 439/131 |
| 2008/0261450 A1 * | 10/2008 | Nguyen et al. .............. | 439/607 |
| 2009/0124104 A1 * | 5/2009 | Zhu et al. .................... | 439/131 |
| 2009/0147462 A1 * | 6/2009 | Zhu et al. ............. | 361/679.31 |
| 2009/0185355 A1 * | 7/2009 | Zhu et al. ................... | 361/755 |
| 2009/0275224 A1 * | 11/2009 | Ni et al. ...................... | 439/131 |

FOREIGN PATENT DOCUMENTS

CN    2735508    10/2005

* cited by examiner

*Primary Examiner*—James Harvey
(74) *Attorney, Agent, or Firm*—Wei Te Chung; Andrew C. Cheng; Ming Chieh Chang (57) ABSTRACT

A flash memory device (8) includes a memory module (2), a screw (3), a gear (4) and a case (1). The memory module (2) has a plug (22) formed at one end thereof. The screw (3) has a first end (30) and a second end (31) opposite to the first end (30). The first end (30) is mounted on the memory module (2). The gear (4) is positioned on the screw (3) and is rotatable relative to the screw (3). The case (1) includes a receiving cavity for receiving the memory module (2), and a first inner case (10) with a first rack (1002) engaging with one side of the gear (4). The first rack (1002) extends along a length direction of the case (1). The memory module (2) has a second rack (2011) engaging with another side of the gear (4). The second rack (2011) extends along the length direction too. The screw (3) is located between the first rack (1002) and the second rack (2011).

19 Claims, 9 Drawing Sheets

FLASH MEMORY DEVICE WITH A RETRACTABLE PLUG

BACKGROUND OF THE INVENTION

1. Field of the Invention

The present invention relates to a flash memory device, and more particularly to a flash memory device with a retractable plug.

2. Description of Related Art

A flash memory device is widely used by consumers as an intermedium for accessing data files from one device to another, or like a portable hard drive for installing materials.

Usually, a flash memory device includes a circuit board with a plurality of electronic components, such as driver chip, memory chip, oscillator, resistor, etc. for saving and loading data, functioning as a miniature hard drive or wireless communication/transmission, a plug connected to one end of the circuit board, and a metal shield enclosing the circuit board. The plug extends out of the metal shield for connecting with various peripherals. The plug usually is a Universal Serial Bus (USB) plug. The USB plug is usually housed and protected from dust by a detachable cap.

However, when a flash memory device is connected with a peripherals, such as a computer, its detached cap may be left unnoticed near the computer and lost due to its small size. Once the extra cap is lost, the USB plug cannot be easily shielded from dust. It is not only flash memory device having above problem, but also other electronic devices with a plug exposed to the air, such as a Wireless Lan Card, Wireless Signal Receiver, etc, facing above problem.

CN Patent No. 2735508 discloses a flash memory device with a retractable plug solving the above problem. The flash memory device has a case with an opening, a memory module with a plug at one end thereof and a revolver. The case defines a receiving cavity for receiving the memory module and at lest a rack at side wall thereof. The revolver engages with the rack for driving the plug in or out of the opening. When the flash memory is not used, the plug is received in the receiving cavity; when the flash memory is in use, the revolver would drive the plug moving out of the opening as rotating the revolver.

However, the revolver is so small that it needs to rotate many circles for driving the plug in or out of the case, and it is hard to control number of the circles. The flash memory device would be raddled easily as rotating in excess. In addition, the revolver will move into the receiving cavity in process of driving the plug out of the case. Thereby the revolver is inconvenient to be operated.

Hence, it is desired to overcome the drawbacks of the conventional flash memory device in terms of improvement.

BRIEF SUMMARY OF THE INVENTION

According to one aspect of the present invention, a flash memory device comprises a memory module, a screw, a gear and a case. The memory module has a plug formed at one end thereof. The screw has a first end and a second end opposite to the first end. The first end is retained on the memory module. The gear is positioned on the screw and is rotatable relative to the screw. The case comprises a receiving cavity for receiving the memory module, and a first inner case with a first rack meshing with one side of the gear. The first rack extends along a length direction. The memory module has a second rack meshing with another side of the gear. The second rack extends along the length direction. The screw is located between the first rack and the second rack.

According to another aspect of the present invention, a flash memory device comprises a case, a memory module, a revolver and a screw. The case defines a receiving cavity and an opening at one end thereof. The memory module is received in the receiving cavity and has a plug formed at one end thereof. The revolver is retained on another end of the case opposite to the plug. The screw has opposite first end and second end. The first end is retained on the memory module and the second end is retained in the revolver. The screw drives the plug in or out of the opening as rotating the revolver.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
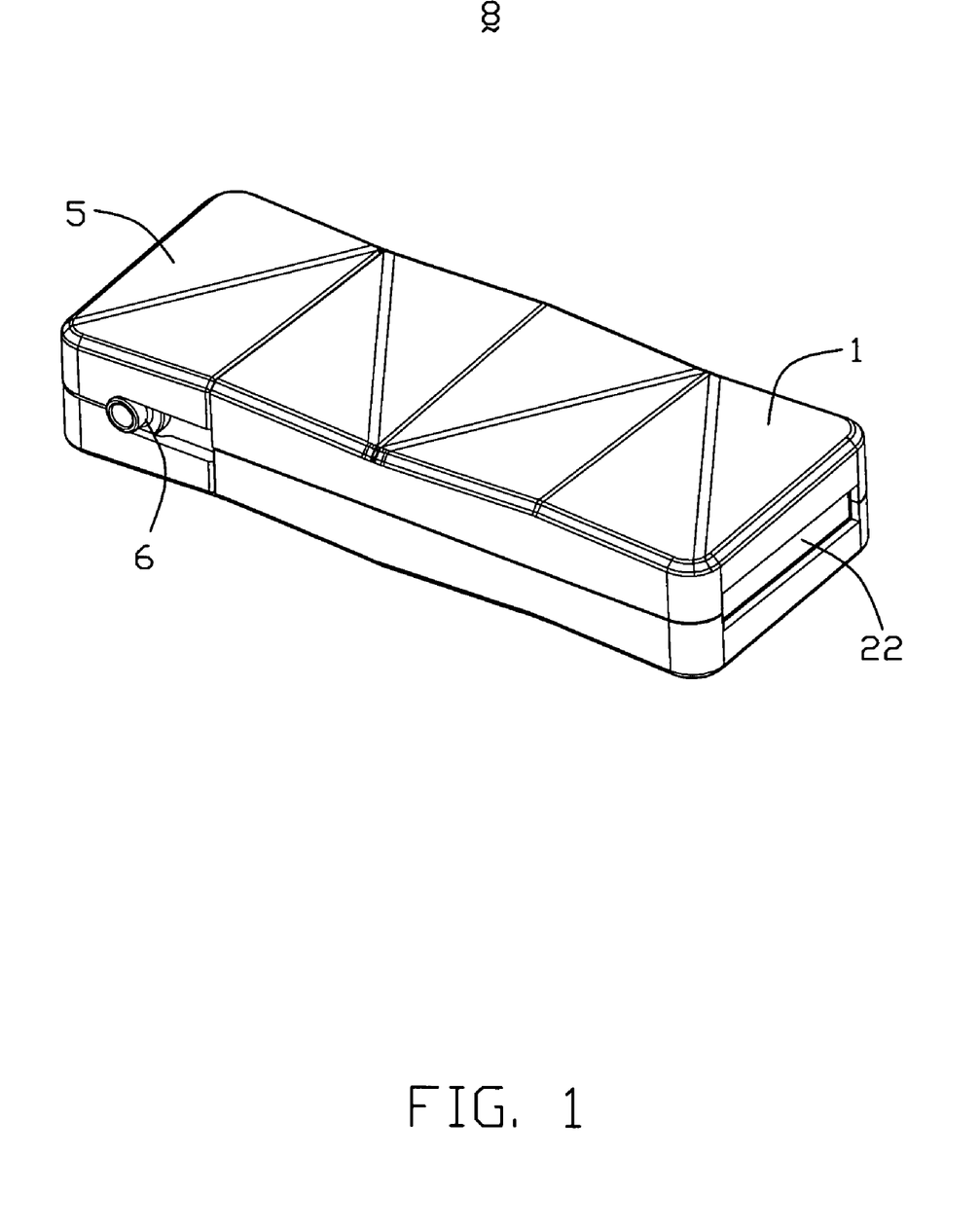
FIG. 1 is a perspective view of the preferred embodiment of a flash memory device according to the present invention.
Figure 2:
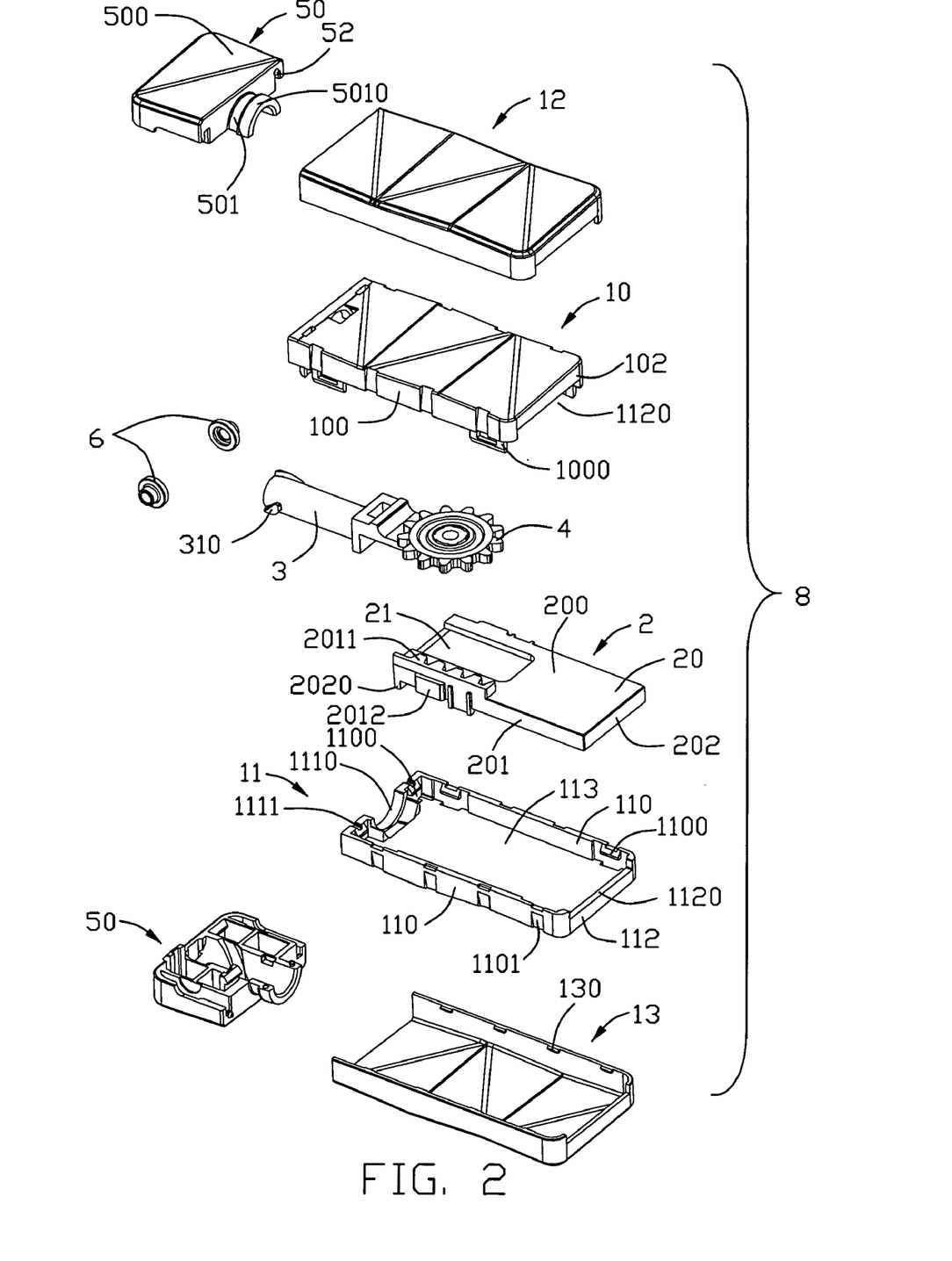
FIG. 2 is a partial exploded perspective view of the flash memory device shown in FIG. 1.
Figure 3:
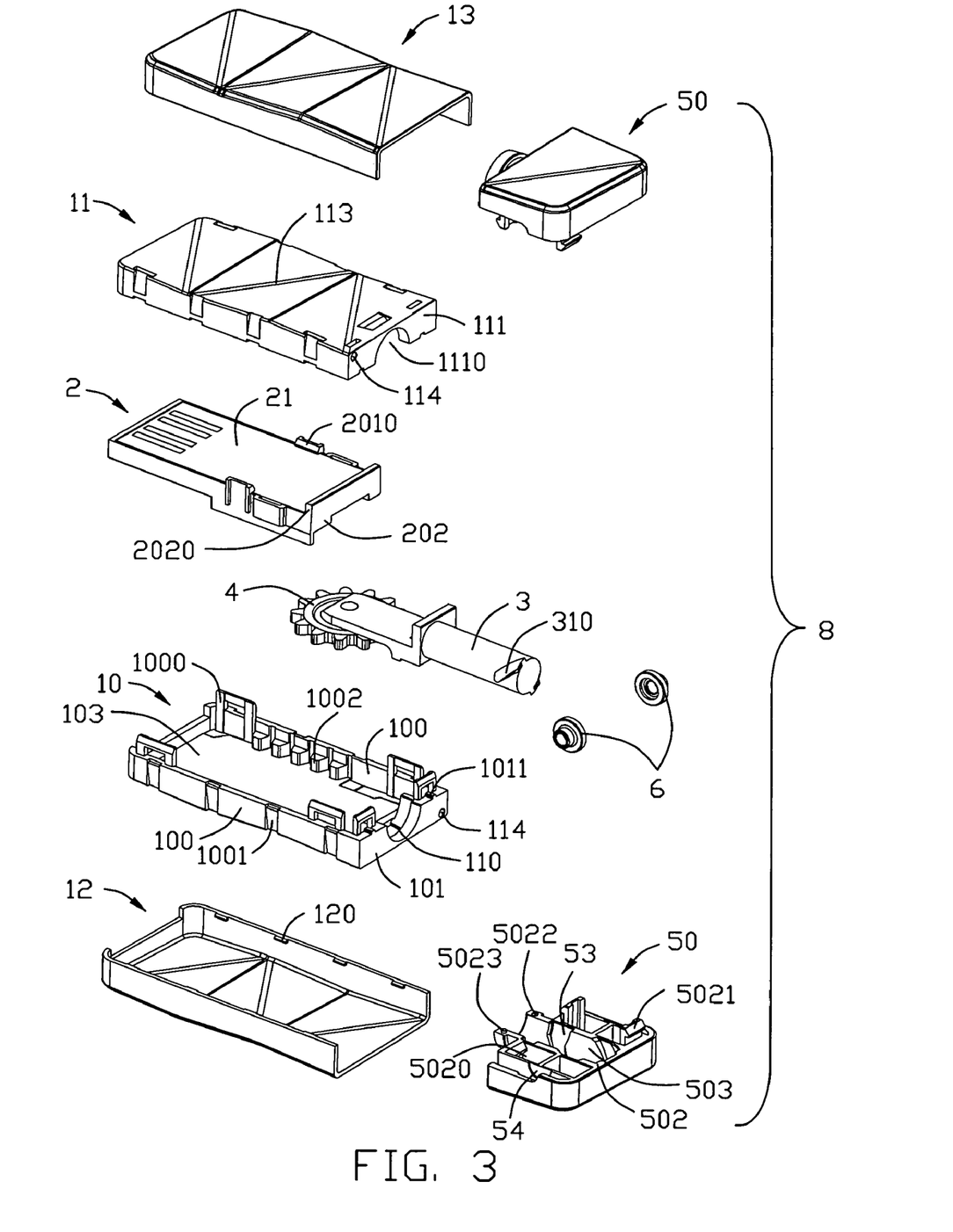
FIG. 3 is a view similar to FIG. 2, while taken from another aspect.

Referring to FIGS. 1-3, a flash memory device 8 is disclosed in accordance with the present invention. The flash memory device 8 comprises a memory module 2, a case 1 enclosing the memory module 2, a screw 3 retained on the memory module 2, a gear 4 positioned on the screw 3 and a revolver 5 retained on one end of case 1. The memory module 2 comprises a movable housing 20 and a circuit board 21 retained therein. The circuit board 21 is coupled with a plurality of electronic components, such as driver chip, memory chip, oscillator, resistor, etc. for saving and loading data, functioning as a miniature hard drive, and has a plug 22 at one end thereof.

The case 1 comprises a pair of inner case and a pair of outer case covering the inner case. The inner case comprises a first inner case 10 and a second inner case 11 coupled with each other. The case 1 defines a receiving cavity (not shown) for receiving the memory module 2.

The second inner case 11 has a pair of opposed second side walls 110 extending along a length direction of the second inner case 11, a second joining wall 111 for connecting the revolver 5, a second mating wall 112 and a bottom wall 113. The length direction is a first direction A. A level direction perpendicular to the first direction A is a second direction B. A plurality of projections 1100 extend inwardly from inside of the second side walls 110 and the second joining wall 111 for fastening the first inner case 10. The second side walls 110 define a plurality of depressions 1101 at outside thereof for engaging with the outer case. The second joining wall 111 defines an arc aperture 1110 at middle thereof and a pair of notches 1111. The second mating wall 112 defines a rectangular opening 1120. A free end of the plug 22 locates at the opening 1120 when the plug 22 is received in the case 1.

The first inner case 10 has a pair of first side walls 100 corresponding to the second side walls 110, a first joining wall 101 for mounting the revolver 5, a first mating wall 102 opposed to the first joining wall 101, and a top wall 103 corresponding to the bottom wall 113. A plurality of latches 1000 extends downwardly from the first side walls 100 and the first joining wall 101 for engaging with the projections 1100 of the second inner case 11. The first side walls 100 define a plurality of depressions 1001 at outside thereof for engaging with the outer case. A first rack 1002 extends inwardly from one first side wall 100 for engaging with one side of the gear 4. The first rack 1002 extends along the first direction A. The first joining wall 101 defines an arc aperture 1110 corresponding to the aperture 1110 of the second joining wall 111. The arc apertures 1110 of the first and second inner case 10, 11 form a circular hole for fastening the revolver 5. The first joining wall 101 has a pair of protrusions 1011 engaging with the notches 1111. The first mating wall 102 defines a rectangular opening 1120 corresponding to that of the second mating wall 112. The openings 1120 of the first and second mating walls 102, 112 form a closed rectangular opening for letting the plug move out of the case 1. Each first and second joining walls 101, 111 defines a recess 114.

The outer case comprises a pair of first outer case 12 and a second outer case 13 covering the first inner case 10 and second inner case 11 respectively. Each first outer case 12 and second outer case 13 has a plurality of embosses 120 engaging with the depressions 1001, 1101 for fixing the inner and outer cases together.

Figure 4:
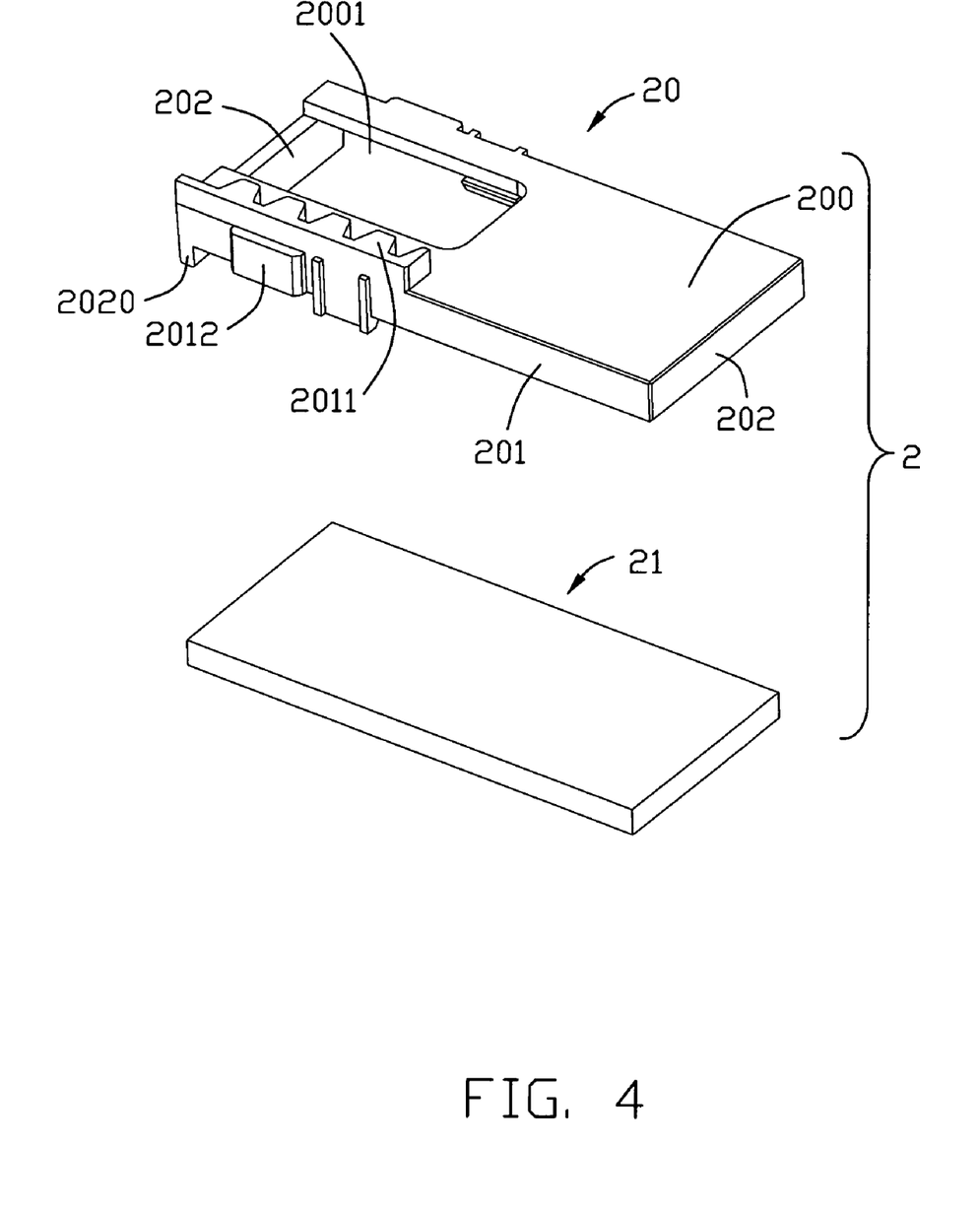
FIG. 4 is an exploded perspective view of a memory module of the flash memory device.
Figure 5:
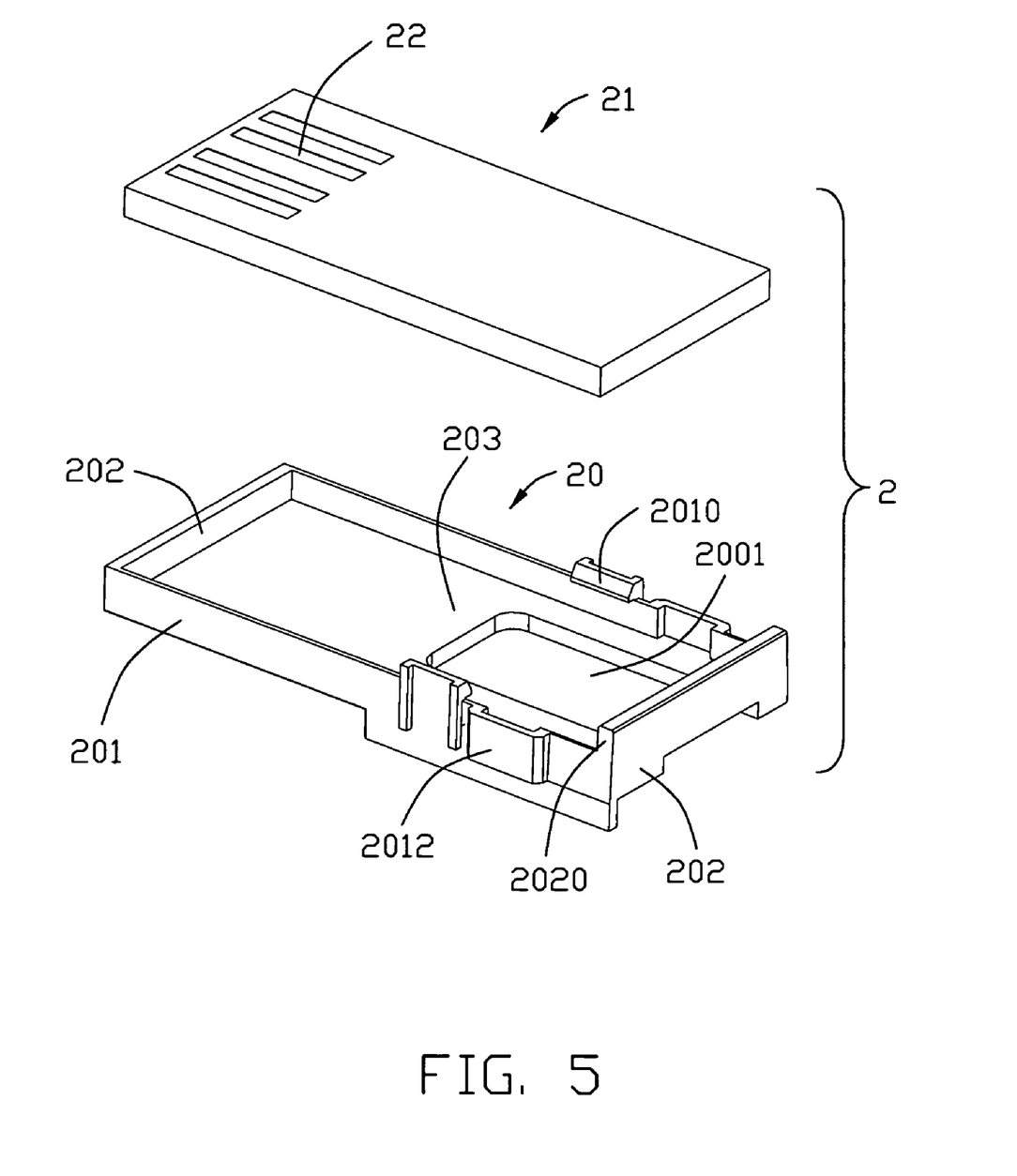
FIG. 5 is a view similar to FIG. 4, while taken from another aspect.

Referring to FIGS. 4 and 5, the movable housing 20 is a rectangular insulator which has a flat portion 200, a pair of side walls 201 extending downwardly form two sides of the flat portion 200, and a pair of two end walls 202 connecting two side walls 201. The flat portion 200 defines a rectangular groove 2001. One side wall 201 has a second rack 2011 corresponding to the first rack 1002 of the first inner case 10. The second rack 2011 extends along the first direction A too. A receiving space 203 is formed between the flat portion 200, two side walls 201 and two end walls 202 for receiving the circuit board 21. A rib 2020 extends downwardly from one end wall 202 far from the plug 22. Another end wall 202 affixed to the plug 22 locates in the opening 1120. The rib 2020 moves on the bottom wall 113 of the second inner case 11 along the first direction A for driving the plug 22 out of or in the case 1. A pair of fasteners 2010 extend from side walls 201 for fastening the circuit board 21 in the receiving space 203. Each side wall 201 has a projection 2012 abutting against the side walls 110 of the second inner case 11 for preventing the memory module 2 moving along the second direction B.

Referring to FIGS. 6-9, the screw 3 is located between the first rack 1002 and the second rack 2011, and has a first end 30, a second end 31 opposite to the first end 30, and a linking portion 301 between the first end 30 and the second end 31. The first end 30 is flat and retained in the groove 2001 of the movable housing 20. The second end 31 is columned and retained in the revolver 5. The first end 30 has a pivot 300. The gear 4 defines a hole 40 ringing on the pivot 300. The gear 4 can rotate around the pivot 300. The gear 4 is located between the first and second racks 1002, 2011, and two opposite sides of the gear 4 mesh with the first and second racks 1002, 2011 respectively. The linking portion 301 abuts against one end of the movable housing 20 when the plug 22 hides in the case 1. The second end 31 has a pair of block 310. The columned second end 31 defines an axes X. The revolver 5 can rotate around the axes X for driving the screw 3 moving along the first direction A.

Figure 6:
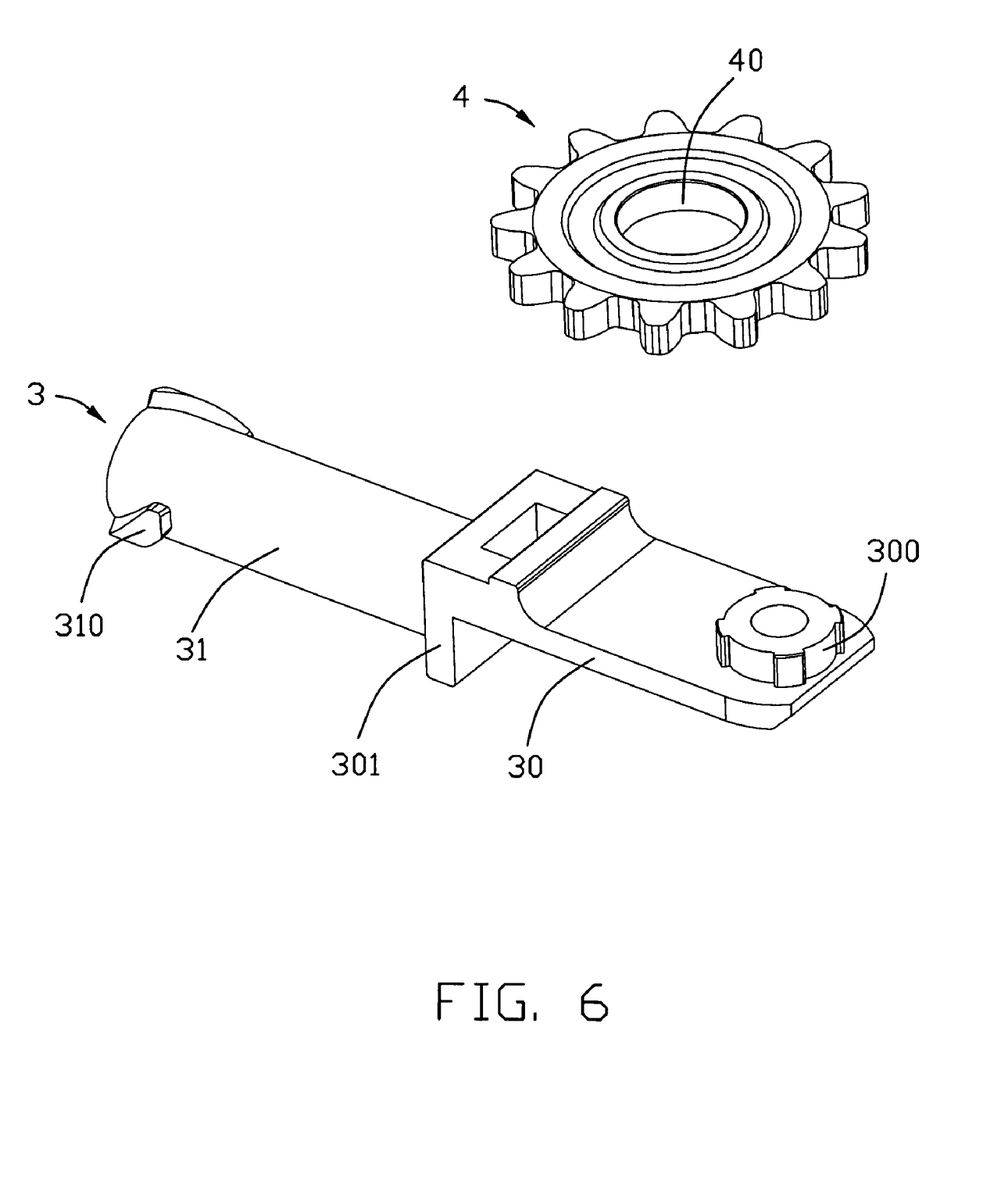
FIG. 6 is a perspective view of a screw and a gear of the flash memory device.
Figure 7:
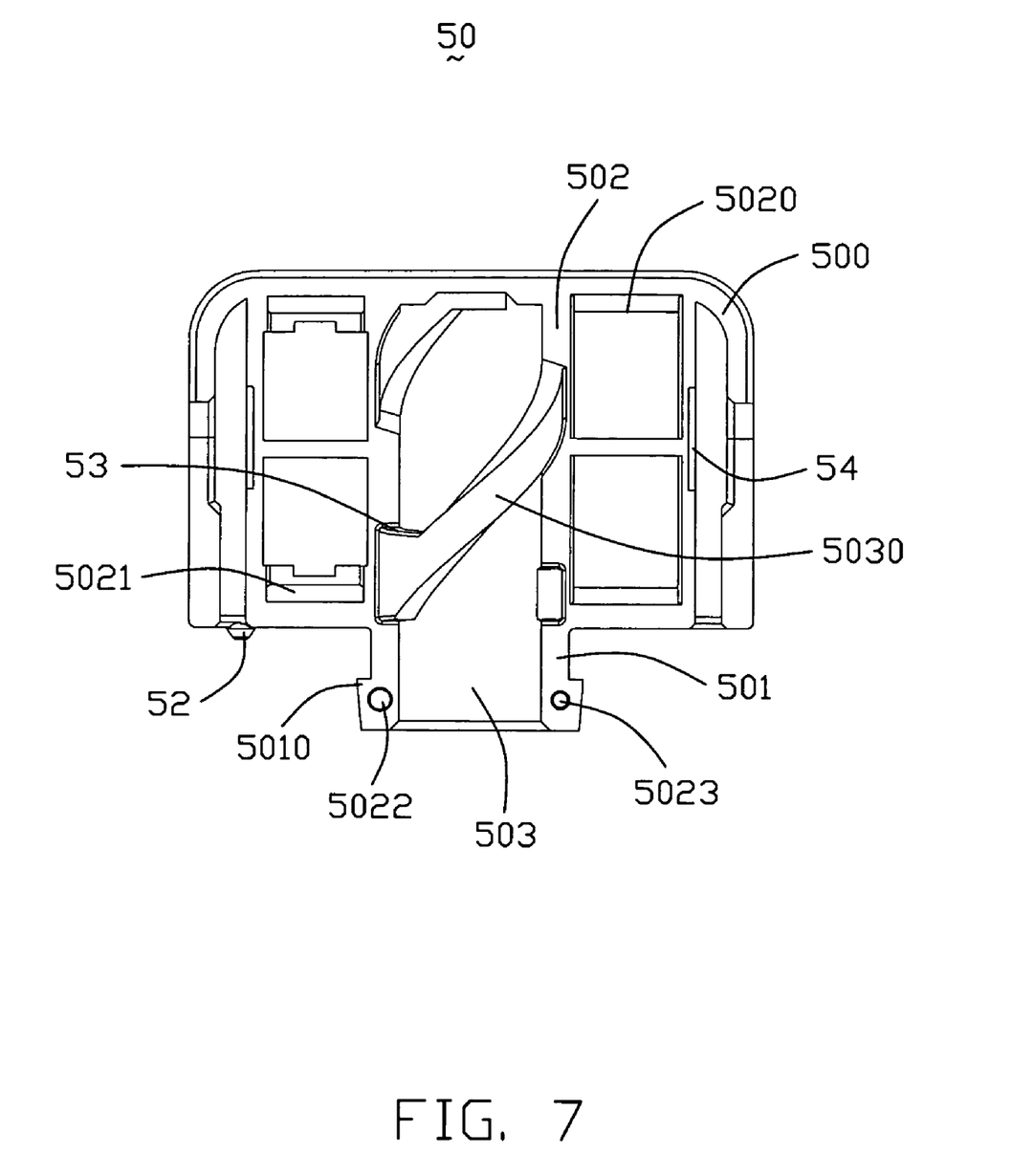
FIG. 7 is a planform view of a housing of the flash memory device.

The revolver 5 is formed by a pair of similar housings 50. Each housing 50 has a mating surface 502, a plurality of barbs 5021 and slots 5020 for fastening two housings 50 together. Each housing 50 has a driving portion 500 for driving the screw 3 moving and a mounting portion 501 secured in the circular hole of the case 1. The mounting portion 501 presents as ring shaped and has a rib 5010 engaging with inside of the joining wall 101, 111 of the case 1 for fastening the revolver 5 on the case 1.

Middle positions of the driving portion 500 and the mounting portion 501 define a mounting slot 503 for receiving the second end 31 of the screw 3. The mounting slot 503 of the driving portion 500 defines a spiral slot 5030 for driving the screw 3 moving along the first direction A. The mating surface 502 of the mounting portion 501 has an emboss 5023 and a recess 5022. One end of the spiral slot 5030 adjacent to the mounting portion 501 forms a limiting portion 53 for preventing the screw 3 rotating backwards automatically. Each driving portion 500 has a protrusion 52 for engaging with the recess 114 of the case 1. When the plug 22 moves out of the opening, the block 310 abuts against the limiting portion 53, and the protrusion 52 engages with the recess 114, thereby the plug 22 can not be pushed into the case 1. Each housing 50 has a pair of depressions 54. A pair of fittings 6 is secured in the depressions 54 for fixing a rope (not shown).

In assembly, firstly, assembling the screw 3 in the revolver 5, the blocks 310 is located in the spiral slot 5030, and assembling the fittings 6 in the depressions 54 at the same time; secondly, ringing the gear 4 on the pivot 300 of the screw 3 and assembling them in the first inner case 10, one side of the gear 4 meshes with the first rack 1002; thirdly, setting the memory module 2 on the screw 3, the first end 30 of the screw 3 is located at the groove 2001 of the movable housing 20, and another side of the gear 4 meshes with the second rack 2011 of the movable housing 20; then mounting the second inner case 11 on the first inner case 10, the latches 1000 engage with the projections 1100 for fastening the first and second inner case 10, 11 together, and the memory module 2 is received in the second inner case 11 now; finally, covering the inner case with the outer case, the flash memory device 8 of the present invention is finished.

Figure 8:
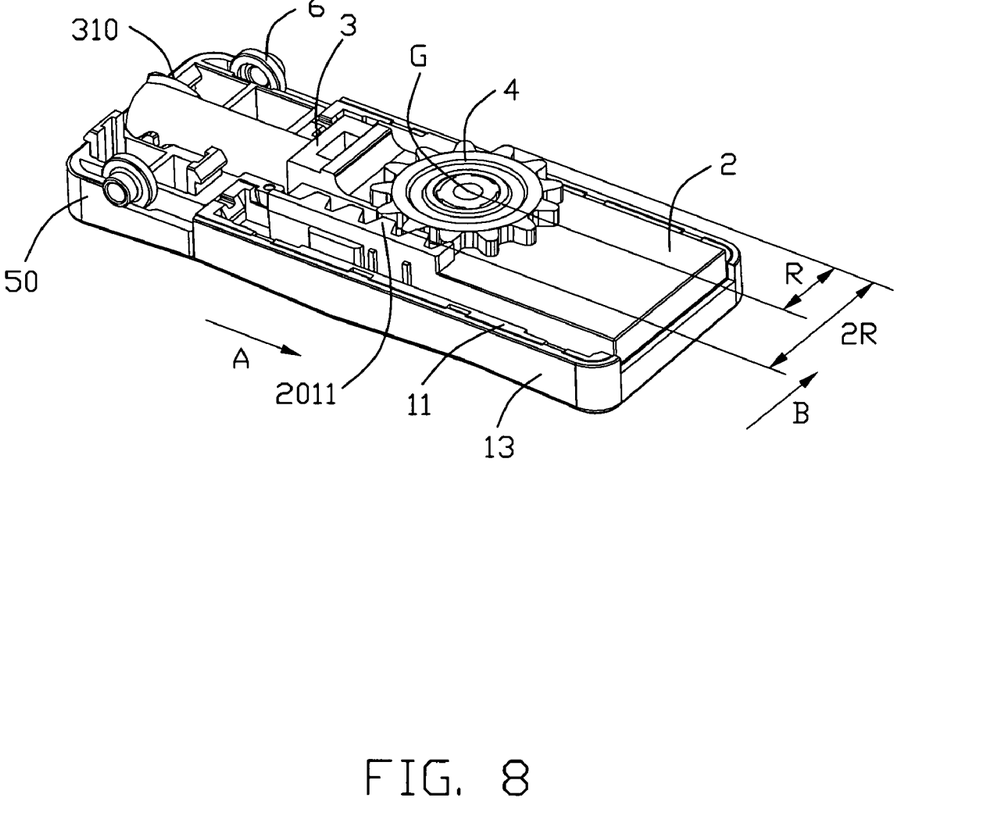
FIG. 8 is a partial perspective view of the flash memory device, which showing a plug is received in a case of the flash memory device.
Figure 9:
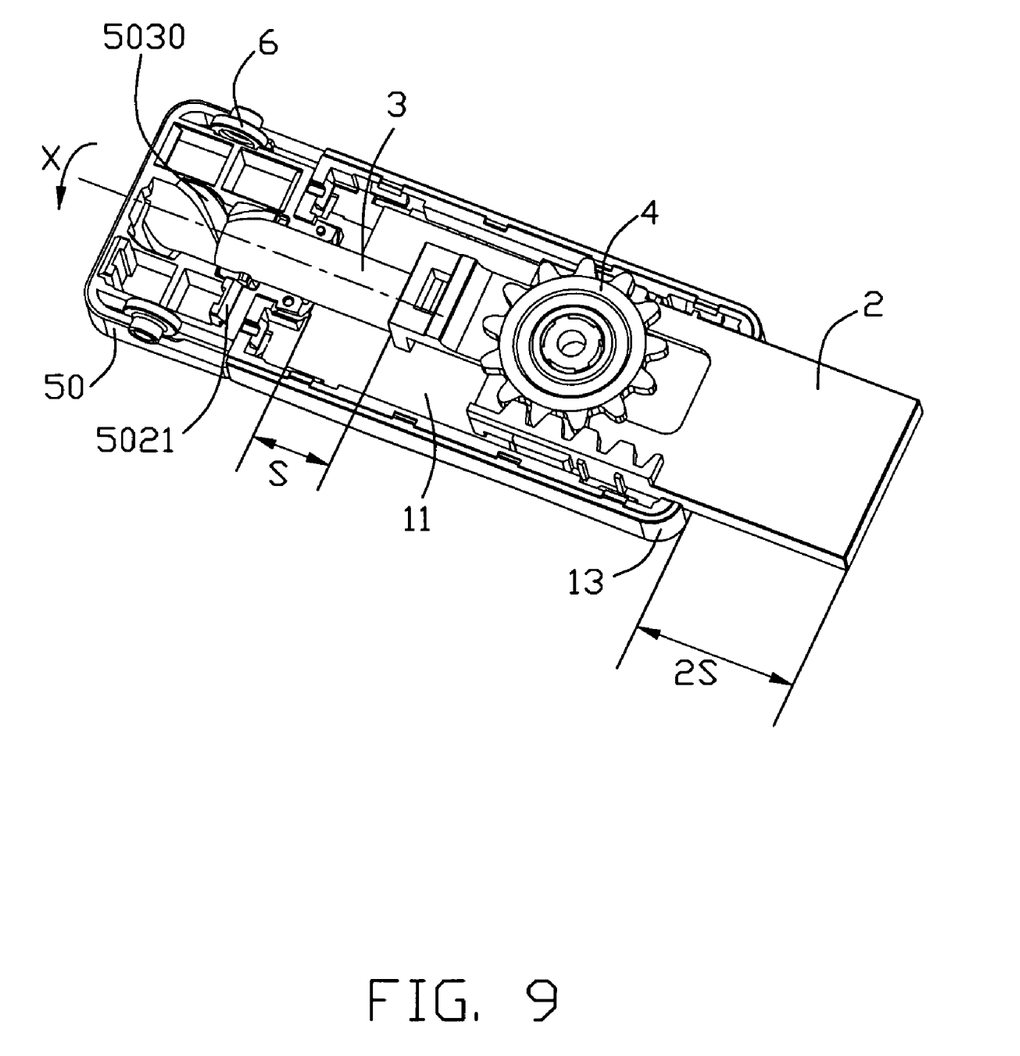
FIG. 9 is a partial perspective view of the flash memory device, which showing the plug extends out of the flash memory device.

Referring to FIGS. 1, 8 and 9, when the plug 22 hides in the case 1, the block 310 of the screw 3 is located at an end of the spiral slots 5030 far from the case 1, and one side of the gear 4 meshes with an end of the first rack 1002 far from the plug 22, and another side of the gear 4 meshes with an end of the second rack 2011 adjacent to the plug 22.

The revolver 5 in the present invention can not moves relative to the case 1 along the first direction A. When rotating the revolver 5 around the axes X, the blocks 310 moves forwardly in the spiral slot 5030 along the first direction A. The gear 4 is moved forwardly due to driving of the screw 3, and rotates around the pivot 300 at the same time. Because the case 1 is unmovable relative to the revolver 5 along the first direction A, the first rack 1002 meshing with one side of the gear 4 is unmovable relative to the revolver 5 too. However, the memory module 2 is movable relative to the case 1, thereby the second rack 2011 meshing with another side of the gear 4 is movable relative to the revolver 5. When the screw 3 drives the gear 4 moving forwardly, the gear 4 will rotate along the first rack 1002 and drives the second racks 2011 moving forwardly. At the same time, the memory module 2 drives the plug 2 moving forwardly. When rotating the revolver 5 by 180 degrees, the plug 22 extends out of the case 1, and the block 310 abuts against the limiting portion 53 for preventing the screw 3 moving backwards.

Because the first rack 1002 is unmovable and one side of the gear 4 moving along the first rack 1002, thereby the first rack 1002 can be seen as an axes of the gear 4 moving forwardly. Movement direction of the screw 3 passes through one point of the gear 4. The speed and distance of the point is same to that of the screw 3. The distance between the point and the first rack 1002 along the second direction B is r. That is to say that, distance between the point and the axes is r, distance between another side of the gear 4 meshing with the second rack 2011 and the axes is n times as long as r. Speed of the point is v, and movement time is t, according to formula of linear speed: $v=2\pi r/t$, speed of another side of the gear 4 meshing with the second rack 2011 is n times as great as v. According to formula of distance: journey is time multiply speed, time of the point and second rack 2011 moving is same, thereby journey of the second rack 2011 is n times as long as that of the point.

The movement direction of the screw 3 in the present invention passes through centre G of the gear 4, thereby said point is the centre G of the gear 4. Distance between the centre G and the axes is R, thereby speed of the centre G is $2\pi R/t$ according to above description. Distance between the another side of the gear 4 meshing with the second rack 2011 and the axes is double R, thereby speed of the second rack 2011 is two times as great as that of the centre G. When rotating the revolver 5 by 180 degrees along a clock direction, journey of the screw 3 moving is S, thereby journey of the second rack 2011 is double S, that is to say, journey of the memory module 2 is magnified to double S. It is obvious that the memory module 2 can move a longer distance when the screw 3 moves a shorter distance, and the plug 22 can be pushed out of the case 1 easily.

When rotating the revolver 5 by 180 degrees along a counterclockwise direction, the screw 3 can drive the plug 22 moving backwardly along the first direction A, and the plug 22 would be hidden in the case 1 for dustproof.

According to detail description of the present invention above, the screw 3, gear 4, the first rack 1002 and second rack 2011 are formed as a magnifying device. Because the first rack 1002 is unmovable, and the second rack 2011 is movable relative to the case 1, the plug 22 can move a longer distance for exposing out of or hiding in the case 1 when the screw 3 moves a shorter distance. The flash memory device 8 of the present invention is easy to be operated, and the screw 3 can not destroy easily. In addition, the plug 22 can move out of or in the case 1 when rotating the revolver 5 by a changeless degree which is 180 degree in the present invention. The 180 degree is easy to control, thereby the revolver 5 is convenient to be operated. Besides, the revolver 5 is located at outside of the case 1 and is unmovable along the first direction A, thereby the revolver 5 is easy to rotate by a consumer.

The screw 3 is separated from the movable housing 20 in the present invention, while the screw 3 can extend integrally from one end of the movable housing 20 opposite to the plug 22. In this way, the flash memory device 8 can only has a case, a movable housing with screw, a circuit board with plug and a revolver, the screw drives the plug moving in or out of the case as rotating the revolver. It is simple and convenient to be operated. As mentioned earlier, the instant invention uses the screw structures to convert rotation of the revolver 5 to a linear movement of the screw 3, and further uses the gear structures to apply an enlarged distance of the linear movement of the screw unto the memory module 2. In this process, the screw 3 functions as an intermediate actuator between the revolver 5 and the memory module 2.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A flash memory device, comprising:
    a memory module having a plug formed at one end thereof;
    a screw having a first end and a second end opposite to the first end, the first end is mounted on the memory module;
    a gear retained on the screw and being rotatable relative to the screw; and
    a case defining a receiving cavity for receiving the memory module, the case comprising a first inner case with a first rack meshing with one side of the gear, the first rack extending along a length direction of the memory module;
    wherein the memory module is movable relative to the case, and has a second rack meshing with another side of the gear, the second rack extends along the length direction, and the screw is located between the first rack and the second rack.

2. The flash memory device according to claim 1, wherein the screw pushes the gear moving a first distance along the length direction, the gear rotates along the first rack and drives the second rack moving a second distance along the length direction at the same time, the second distance is longer than the first distance.

3. The flash memory device according to claim 2, wherein the memory module drives the plug moving a distance same to the second distance, the first inner case, the screw, the gear and the memory module are formed as a magnifying device to push the memory module moving relative to the case, and driving the plug in or out of the case.

4. The flash memory device according to claim 1, wherein the second end of the screw extends out of the case.

5. The flash memory device according to claim 1, wherein the memory module defines a groove, and the first end is located in the groove.

6. The flash memory device according to claim 1, wherein the first end has a pivot, and the gear defines a hole ringing on the pivot and rotates around the pivot.

7. The flash memory device according to claim 1, further comprising a revolver retained on one end of the case, wherein the second end of the screw is retained in the revolver.

8. The flash memory device according to claim 7, wherein the revolver defines a spiral slot, and the second end of the screw has a block moving in the spiral slot.

9. The flash memory device according to claim 1, wherein the first inner case has a pair of side walls, and the first rack extends inwardly from one of the pair of side walls.

10. The flash memory device according to claim 1, wherein the memory module comprises a movable housing and a circuit board retained therein, and the second rack extends towards the first rack from one side of the movable housing.

11. A flash memory device, comprising:
- a case defining a receiving cavity and an opening at one end thereof;
- a memory module received in the receiving cavity and having a plug formed at one end thereof;
- a revolver retained on another end of the case opposite to the opening; and
- a screw having opposed first end and second end, the first end retained on the memory module and the second end retained in the revolver;
- wherein the screw drives the plug in or out of the opening as the revolver rotates;
- wherein the case defines a circular hole opposite to the opening, the revolver has an annular post retained in the circular hole.

12. The flash memory device according to claim 11, wherein the memory module has a movable housing and a circuit board retained in the movable housing, and the plug is formed on the circuit board.

13. The flash memory device according to claim 12, wherein the screw extends integrally from one end of the movable housing opposite to the plug.

14. The flash memory device according to claim 13, wherein the movable housing defines a recess, the first end is received in the recess.

15. The flash memory device according to claim 11, wherein the revolver defines a spiral slot, and the second end of the screw has a block moving in the spiral slot.

16. A flash memory device comprising:
- a case defining an internal space and having one opening on one end;
- a memory module received in the internal space and moveable along an axial direction to be in an in-and-out condition, via said opening, relative to the case;
- an intermediate actuator located in the internal space and moveable along said axial direction;
- a revolver located on the case opposite to said end in said axial direction;
- screw structures formed between said revolver and said intermediate actuator to convert rotation of the revolver to a linear movement of the intermediate actuator with a first distance; and
- gear structures formed between the intermediate actuator and the memory module to convert the linear movement of the intermediate actuator with said first distance to a linear movement of the memory module with a second distance which is larger than said first distance.

17. The flash memory device as claimed in claim 16, wherein said revolver is located at the other end of the case.

18. The flash memory device as claimed in claim 16, wherein said second distance is twice with regard to the first distance.

19. The flash memory device as claimed in claim 18, wherein said gear structure is further applied to an interior structure of the case.

* * * * *